(12) United States Patent
Kim et al.

(10) Patent No.: US 9,657,167 B2
(45) Date of Patent: May 23, 2017

(54) THERMOPLASTIC RESIN COMPOSITION

(71) Applicant: Cheil Industries Inc., Gumi-si (KR)

(72) Inventors: Hye-Young Kim, Uiwang-si (KR);
Doo-Han Ha, Uiwang-si (KR);
Jin-Young Huh, Uiwang-si (KR);
Young-Sin Kim, Uiwang-si (KR);
Ywan-Hee Lee, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/728,123

(22) Filed: Dec. 27, 2012

(65) Prior Publication Data

US 2013/0172468 A1 Jul. 4, 2013

(30) Foreign Application Priority Data

Dec. 30, 2011 (KR) .................. 10-2011-0147863

(51) Int. Cl.
*C08K 7/00* (2006.01)
*C08L 33/10* (2006.01)

(52) U.S. Cl.
CPC .............. *C08L 33/10* (2013.01); *C08K 7/00* (2013.01)

(58) Field of Classification Search
CPC ............................................ C08K 7/00
USPC ................................... 523/210, 216
See application file for complete search history.

(56) References Cited

U.S. PATENT DOCUMENTS

| | | | |
|---|---|---|---|
| 4,086,100 A * | 4/1978 | Esselborn et al. | A61K 8/26 106/417 |
| 5,423,912 A | 6/1995 | Sullivan et al. | |
| 5,472,491 A | 12/1995 | Duschek et al. | |
| 5,759,255 A * | 6/1998 | Venturini et al. | 106/418 |
| 6,280,837 B1 * | 8/2001 | Mitzutani et al. | 428/323 |
| 7,019,048 B2 | 3/2006 | Brehm et al. | |
| 7,619,031 B2 | 11/2009 | Kanayama et al. | |
| 8,691,138 B2 | 4/2014 | Kang et al. | |
| 2002/0096087 A1 | 7/2002 | Glausch | |
| 2006/0223932 A1 | 10/2006 | Kieser et al. | |
| 2007/0276083 A1 | 11/2007 | Higashi et al. | |
| 2010/0089291 A1 | 4/2010 | Kang et al. | |
| 2011/0160343 A1 * | 6/2011 | Son et al. | C08L 33/12 523/437 |
| 2012/0264869 A1 | 10/2012 | Lee et al. | |
| 2012/0270988 A1 | 10/2012 | Lee et al. | |

FOREIGN PATENT DOCUMENTS

| | | |
|---|---|---|
| CN | 1369517 A1 | 9/2002 |
| CN | 101171287 A | 4/2008 |
| CN | 103183950 A | 7/2013 |
| EP | 0342533 A1 | 11/1989 |
| JP | 61-241333 | 10/1986 |
| JP | 61-252224 A | 11/1986 |
| JP | 1989-292067 A | 11/1989 |
| JP | 1995-18199 A | 1/1995 |
| JP | 1995-268241 A | 10/1995 |
| JP | 09-183918 | 7/1997 |
| JP | 1997-255891 A | 9/1997 |
| JP | 10-310721 | 11/1998 |
| JP | 2000-505833 A | 5/2000 |
| JP | 2002-192575 | 7/2002 |
| JP | 2002-194247 A | 7/2002 |
| JP | 2006-083269 A | 3/2006 |
| KR | 10-2005-0056187 | 6/2005 |
| KR | 10-2006-0056986 A | 5/2006 |
| KR | 10-2006-0104109 A | 10/2006 |
| KR | 10-2006-0116668 A | 11/2006 |
| KR | 10-0788042 B1 | 12/2007 |
| KR | 10-2011-0057415 A | 6/2011 |
| KR | 10-2011-0079466 A | 7/2011 |
| WO | WO 2009115249 A1 * | 9/2009 |
| WO | 2011/010812 A2 | 1/2011 |

OTHER PUBLICATIONS

Bamfield, Peter Hutchings, Michael G.. (2010). Chromic Phenomena—Technological Applications of Colour Chemistry (2nd Edition)—2.4.1 Organic Pigments, pp. 180-189. Royal Society of Chemistry. Online version available at: http://app.knovel.com/hotlink/pdf/id:kt00BZDNN1/chromic-phenomena-technological/quinacridones.*

Hunter Lab Applications Note vol. 8, No. 9., pp. 1-4, 2008.*

European Search Report in counterpart European Application No. 12199529.4 dated Apr. 23, 2013, pp. 1-4.

Search Report in counterpart Chinese Application No. 201210591141.6 dated Jul. 28, 2014, pp. 1-3.

\* cited by examiner

*Primary Examiner* — Edward Cain

(74) *Attorney, Agent, or Firm* — Additon, Higgins & Pendleton, P.A.

(57) ABSTRACT

A thermoplastic resin composition includes a thermoplastic resin; a pearlescent pigment; and a pigment that is not the same as the pearlescent pigment, wherein the pearlescent pigment and pigment have da and db satisfying da<15 and db<15 in an L*a*b* colorimetric system, respectively.

5 Claims, 1 Drawing Sheet

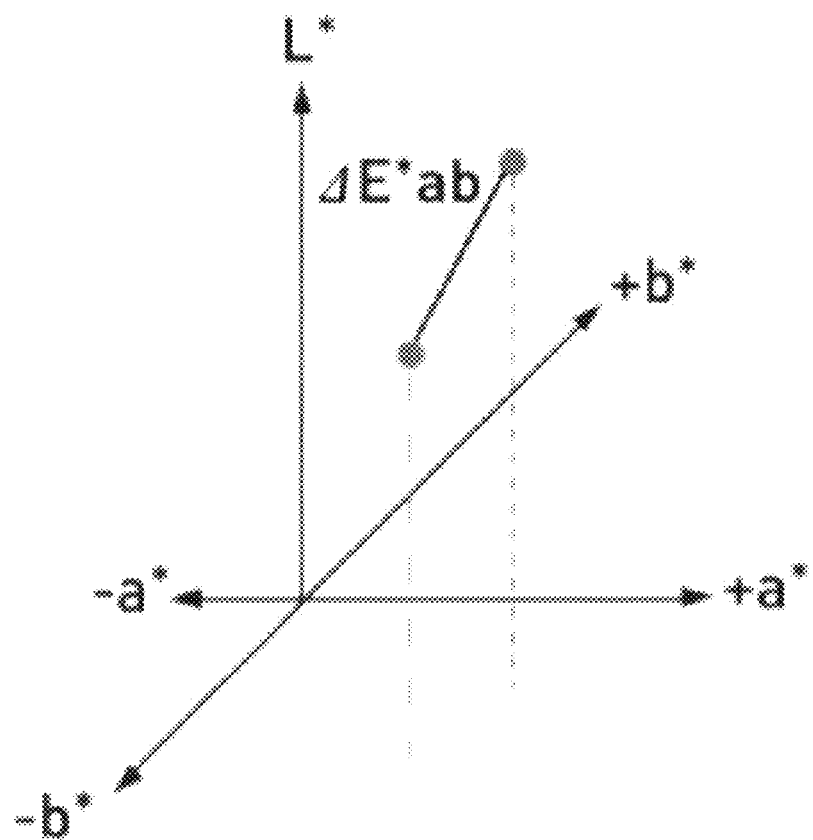

THERMOPLASTIC RESIN COMPOSITION

CROSS-REFERENCE TO RELATED APPLICATION

This application claims priority to and the benefit of Korean Patent Application No. 10-2011-0147863 filed in the Korean Intellectual Property Office on Dec. 30, 2011, the entire disclosure of which is incorporated herein by reference.

FIELD OF THE INVENTION

A thermoplastic resin composition is disclosed.

BACKGROUND OF THE INVENTION

Pearlescent pigments are known. An example includes a substrate such as mica coated with a metal oxide having a high refractive index such as titanium dioxide or the like on the surface thereof.

Recently, a pearlescent pigment using plate-shaped alumina as a substrate to improve surface smoothness, heat resistance, and transparency which are defects of mica, has been disclosed (Japanese Patent Laid-Open Publication No. 1997-255891).

However, the method disclosed in the patent specification may not provide a pigment having a satisfactory brightness when the substrate is plate-shaped alumina produced by a hydrothermal method. In this case, adherence of metal oxide particle to the plate-shaped alumina can be significantly deteriorated, and the metal oxide can coagulate to form a large coagulated particle.

In addition, even if the metal oxide particle adheres to the plate-shaped alumina, the particle size of metal oxide coated on the substrate is large, and it can be difficult to provide a silky pearlescent gloss having uniform brightness without particle texture, so that the decorative effect required in various fields may not be satisfactory.

In addition to the above method which attempts to improve the inherent properties of the pearlescent pigment, there have also been efforts to prevent flow marks or weld lines when injection molding a thermoplastic resin composition including a pearlescent pigment. Such efforts, however, have met with limited success.

SUMMARY OF THE INVENTION

One embodiment of the present invention provides a thermoplastic resin composition that can have a pearlescent gloss effect changing color according to an angle between a light source and the naked eye and which can form few or no flow mark(s) and/or weld line(s) during injection molding.

According to one embodiment of the present invention, provided is a thermoplastic resin composition that includes a thermoplastic resin; a pearlescent pigment; and a pigment that is different from the pearlescent pigment, wherein the pearlescent pigment and pigment have da and db satisfying da<15 and db<15 measured in accordance with an L*a*b* colorimetric system, respectively.

The thermoplastic resin composition may include the pearlescent pigment in an amount of about 0.1 to about 2 parts by weight, for example about 0.1 to about 1 part by weight, based on about 100 parts by weight of thermoplastic resin.

The thermoplastic resin composition may include the pigment that is different from the pearlescent pigment in an amount of about 0.1 to about 2 parts by weight, for example about 0.1 to about 1 part by weight, based on about 100 parts by weight of thermoplastic resin.

The pigment that is different from the pearlescent pigment may be an organic pigment, an inorganic pigment, or a combination thereof.

The pearlescent pigment may have an average particle diameter of about 0.1 to about 50 μm.

The thermoplastic resin may be a polycarbonate resin, a rubber modified vinyl-based copolymer resin, a polyester resin, a polyalkyl(meth)acrylate resin, a styrenic resin, a polyolefin resin, or a combination thereof.

The thermoplastic resin composition may further comprise an inorganic particle. Examples of the inorganic particle may include without limitation glass particles, mica, graphite, pearl particles, and the like, and combinations thereof.

The thermoplastic resin composition may include the inorganic particle in an amount of about 0.1 to about 3 parts by weight based on about 100 parts by weight of the thermoplastic resin.

The invention also provides a molded product made using the thermoplastic resin composition. The molded product can have a pearlescent appearance changing colors depending on the angles between a light source and the naked eye and can have minimal or no flow mark(s) and/or weld line(s) generated during injection molding processes.

BRIEF DESCRIPTION OF THE DRAWING

The FIGURE is a graph showing a color difference on an L*a*b* colorimetric system.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

When a specific definition is not otherwise provided, the term "(meth)acrylate" may refer to "acrylate" and "methacrylate". "(meth)acrylic acid alkyl ester" may refer to both "acrylic acid alkyl ester" and "methacrylic acid alkyl ester".

When a specific definition is not otherwise provided, the term "diameter" refers to the length of a line connecting two points in a closed curved, passing through the center of a particle, and the "closed curve" is a curved line where a point moves in one direction and returns to the departure point. Also as used herein, the term "long diameter" (major axis) indicates the longest diameter of the particle, and the term "average particle diameter" indicates the diameter of 50% on cumulative particle size distribution curve. As used herein, the term "thickness" means the length of the longest axis perpendicular to the plane containing the major axis and the minor axis.

The average particle diameter in this specification was determined by taking a sample of a molded article, scanning a cross section of the sample by a scanning electron microscope (SEM), measuring the diameters of over 50 particles which exist on the image.

In one embodiment of the present invention, a composition that can provide a pearlescent gloss appearance and a molded product thereof is provided. Flop index can be used as a performance index of the molded product.

Flop index is used as an index of metal-like texture of a surface and may be generally obtained by measuring luminance (L) of reflective light at about 15°, 45° and 110°. The flop index may be defined in the following Equation 1.

$$FI=2.69*(L(15°)-(L(110°))^{1.11}/L(45°)^{0.86}$$ [Equation 1]

In Equation 1, FI refers to a flop index; L 15° refers to a reflective luminance (L) at about 15'; L 45° refers to a reflective luminance (L) at about 45'; and L 110° refers to a reflective luminance (L) at about 110°. The flop index of a surface having no metal texture is indicated as 0, the flop index of metal ranges from about 15 to about 17, the flop index of a metal texture coating used for an automobile body paint is about 11; and the flop index of the metal texture sensed by eyes (that is, which can be detected or is visible to the naked eye) is greater than or equal to about 6.5.

The L*a*b* colorimetric system referenced in this specification is a standard of measurement known in the art used to indicate color difference (dE or ΔE*ab) and means the color difference between two colors stimuli defined by dL, da, and db which are differences of color coordinate L*a*b*, which are represented by positive symbol of dE*ab as shown in the following Equation 2:

$$dE^*ab=[(dL^*)^2+(da^*)^2+(db^*)^2]^{1/2}$$ [Equation 2]

Generally, dL is a deviation of lightness and darkness; da is a deviation of red and green values, db is a deviation of yellow and blue values, and the color difference is the value obtained by square root of adding all the squares of each dL, da and db.

The FIGURE is a graph showing a color difference represented by Equation 2 in an L*a*b* colorimetric system, and the detailed description thereof is omitted because it is the same as above.

The dL, da, and db in this specification are measured by using a spectrophotometer (manufacturer: Konica Minolta Co. model name: CM-3500d).

According to one embodiment of the present invention, provided is a thermoplastic resin composition that includes a thermoplastic resin; a pearlescent pigment; and a pigment that is different than the pearlescent pigment, wherein the pearlescent pigment and pigment have da and db satisfying da<15 and db<15 in an L*a*b* colorimetric system, respectively.

When adding a plate-shaped inorganic material, the flow mark or the weld line can be significant and thus a complicated injection molding process may be required. This in turn can limit molding only simple-shaped injection molded products.

In contrast, when the pearlescent pigment and the pigment that is different from the pearlescent pigment have da and db satisfying da<15 and db<15 in the L*a*b* colorimetric system, respectively, the flow mark and/or the weld line which may be generated by an injection molding process may be invisible to the naked eye. Also the pearlescent molded product may be produced by an injection molding process, for example, using a pearlescent pigment and pigment that is different from the pearlescent pigment having a similar color, without requiring a subsequent painting process.

The thermoplastic resin composition may include the pearlescent pigment in an amount of about 0.1 to about 2 parts by weight, for example about 0.1 to about 1 part by weight, based on about 100 parts by weight of thermoplastic resin. In some embodiments, the thermoplastic resin composition may include the pearlescent pigment in an amount of about 0.1, 0.2, 0.3, 0.4, 0.5, 0.6, 0.7, 0.8, 0.9, 1, or 2 parts by weight. Further, according to some embodiments of the present invention, the amount of the pearlescent pigment can be in a range from about any of the foregoing amounts to about any other of the foregoing amounts.

When the thermoplastic resin includes the pearlescent pigment in an amount within the above range, the obtained pearlescent molded product may have an improved appearance. However, when the pearlescent pigment is used in an amount outside of the above range, the pearlescent texture can be insufficient and/or physical properties such as impact strength, thermal stability or the like can be deteriorated.

The pigment that is different from the pearlescent pigment may be an organic pigment, an inorganic pigment, or a combination thereof, which is described hereinafter.

The thermoplastic resin composition may include the pigment that is different from the pearlescent pigment in an amount of about 0.1 to about 2 parts by weight, for example about 0.1 to about 1 part by weight, based on about 100 parts by weight of thermoplastic resin. In some embodiments, the thermoplastic resin composition can include the pigment in an amount of about 0.1, 0.2, 0.3, 0.4, 0.5, 0.6, 0.7, 0.8, 0.9, 1, or 2 parts by weight. Further, according to some embodiments of the present invention, the amount of the pigment may be in a range from about any of the foregoing amounts to about any other of the foregoing amounts.

When the thermoplastic resin composition includes the pigment in an amount within the above range, the obtained pearlescent molded product may have an improved appearance, and the amount of the pigment may be adjusted according to the amount of the pearlescent pigment.

The thermoplastic resin composition generates few or no flow marks and/or weld lines during injection molding, so as to provide a molded product that can have an excellent pearlescent gloss.

Accordingly, the thermoplastic resin composition of the invention may be used in the production of a molded product that can have an excellent appearance, such as but not limited to exterior plastic products for electronic parts, automobile parts and the like without requiring an additional painting process.

Hereinafter each component included in the thermoplastic resin composition is described in detail.

Thermoplastic Resin

The thermoplastic resin may be any thermoplastic resin. Examples of the thermoplastic resin may include without limitation polycarbonate resins, rubber modified vinyl-based copolymer resins, polyester resins, polyalkyl(meth)acrylate resins, styrenic resins, polyolefin resins, and the like, and combinations thereof. The thermoplastic resin may provide basic properties such as impact resistance, heat resistance, flexural properties, tensile properties, and the like.

The polycarbonate resin may be prepared by reacting one or more diphenols with a compound of a phosgene, halogen formate, carbonate ester, or a combination thereof.

Examples of the diphenols include without limitation hydroquinone, resorcinol, 4,4'-dihydroxydiphenyl, 2,2-bis(4-hydroxyphenyl)propane (referred to as "bisphenol-A"), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4- hydroxyphenyl)ketone, bis(4-hydroxyphenyl)ether, and the like, and combinations thereof. In exemplary embodiments, 2,2-bis(4-hydroxyphenyl)propane, 2,2-bis(3,5-dichloro-4-hydroxyphenyl)propane or 1,1-bis(4-hydroxyphenyl)cyclohexane may be used, for example 2,2-bis(4-hydroxyphenyl) propane may be used.

The polycarbonate resin may have a weight average molecular weight of about 10,000 to about 200,000 g/mol, for example about 15,000 to about 80,000 g/mol, but the present invention is not limited to the use of polycarbonate with a molecular weight falling within the above ranges.

The polycarbonate resin may be a copolymer or a mixture of copolymers obtained using two or more diphenols that differ from each other. The polycarbonate resins may also include without limitation linear polycarbonate resins, branched polycarbonate resins, polyester carbonate copolymer resins, and the like, and combinations thereof.

The linear polycarbonate resin may include a bisphenol-A-based polycarbonate resin. The branched polycarbonate resin may be produced by reacting a multi-functional aromatic compound such as trimellitic anhydride, trimellitic acid, and the like with one or more diphenols and a carbonate. The multi-functional aromatic compound may be included in an amount of about 0.05 to about 2 mol % based on the total weight of the branched polycarbonate resin. The polyester carbonate copolymer resin may be produced by reacting difunctional carboxylic acid with one or more diphenols and a carbonate. The carbonate may include a diaryl carbonate such as diphenyl carbonate, ethylene carbonate, and the like.

The rubber modified vinyl-based copolymer resin may include about 5 to about 95 wt % of a vinyl-based copolymer and about 5 to about 95 wt % of a rubbery polymer.

In some embodiments, the rubber modified vinyl-based copolymer resin may include a vinyl-based copolymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of vinyl-based copolymer can be in a range from about any of the foregoing amounts to about any other of the foregoing amounts.

In some embodiments, the rubber modified vinyl-based copolymer resin may include a rubbery polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of rubbery polymer can be in a range from about any of the foregoing amounts to about any other of the foregoing amounts.

Examples of the rubbery polymer may include without limitation butadiene rubbers, acrylic rubbers, ethylene/propylene rubbers, styrene/butadiene rubbers, acrylonitrile/butadiene rubbers, isoprene rubbers, ethylene-propylene-diene terpolymer (EPDM) rubbers, polyorganosiloxane/polyalkyl(meth)acrylate rubber composites, and the like, and combinations thereof.

The vinyl-based copolymer may be a copolymer of about 50 to about 95 wt % of a first vinyl-based monomer including an aromatic vinyl monomer, an acrylic-based monomer, a heterocyclic monomer, or a combination thereof; and about 5 to about 50 wt % of a second vinyl-based monomer including an unsaturated nitrile monomer, an acrylic-based monomer, a heterocyclic monomer, or a combination thereof.

In some embodiments, the vinyl-based copolymer may include the first vinyl-based monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the first vinyl-based monomer can be in a range from about any of the foregoing amounts to about any other of the foregoing amounts.

In some embodiments, the vinyl-based copolymer may include the second vinyl-based monomer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the second vinyl-based monomer can be in a range from about any of the foregoing amounts to about any other of the foregoing amounts.

Examples of the aromatic vinyl monomer may include without limitation styrene, C1 to C10 alkyl-substituted styrenes, halogen-substituted styrenes, and the like, and combinations thereof. Examples of the alkyl-substituted styrene may include without limitation o-ethyl styrene, m-ethyl styrene, p-ethyl styrene, α-methyl styrene, and the like, and combinations thereof.

Examples of the acrylic-based monomer may include without limitation (meth)acrylic acid alkyl esters, (meth)acrylic acid esters, and the like, and combinations thereof. As used herein, the alkyl may be a C1 to C10 alkyl. Examples of the (meth)acrylic acid alkyl ester may include without limitation methyl(meth)acrylate, ethyl(meth)acrylate, propyl(meth)acrylate, butyl(meth)acrylate, and the like, and combinations thereof. In exemplary embodiments, methyl(meth)acrylate may be used.

Examples of the heterocyclic monomer may include without limitation maleic anhydride, C1 to C10 alkyl or phenyl N-substituted maleimides, and the like, and combinations thereof.

Examples of the unsaturated nitrile monomer may include without limitation acrylonitrile, methacrylonitrile, ethacrylonitrile, and the like, and combinations thereof.

When the rubber modified vinyl-based copolymer is prepared, a rubber particle may have a particle diameter of about 0.05 to about 4 μm to improve the impact resistance and surface appearance of a molded product. When the particle diameter of the rubber particle ranges from about 0.05 to about 4 μm, excellent impact strength may be secured.

The rubber modified vinyl-based copolymer may be used singularly or as a mixture of two or more.

The rubber modified vinyl-based copolymer may include styrene, acrylonitrile, and optionally methyl(meth)acrylate graft-copolymerized on a butadiene rubber, an acrylic rubber, or a styrene/butadiene rubber.

The rubber modified vinyl-based copolymer may include methyl(meth)acrylate graft-copolymerized on a butadiene rubber, an acrylic rubber, or a styrene/butadiene rubber.

The rubber modified vinyl-based copolymer may include an acrylonitrile-butadiene-styrene copolymer resin.

The method of preparing the rubber modified vinyl-based copolymer is widely known to those skilled in the art, and any method among emulsion polymerization, suspension polymerization, solution polymerization and bulk polymerization may be used. Emulsion polymerization or bulk polymerization includes adding the aforementioned aromatic vinyl monomer to a rubbery polymer and using a polymerization initiator.

The polyester resin is an aromatic polyester resin, and it may be a condensation-polymerized resin obtained from terephthalic acid or terephthalic acid alkyl ester, and a C2 to C10 glycol. As used herein, the alkyl may be a C1 to C10 alkyl.

Examples of the aromatic polyester resin may include without limitation polyethylene terephthalate resins, polytrimethylene terephthalate resins, polybutylene terephthalate resins, polyhexamethylene terephthalate resins, polycyclohexane dimethylene terephthalate resins, polyester resins modified into a non-crystalline resin by mixing the resins with another monomer, and the like, and combinations thereof. In exemplary embodiments, the aromatic polyester resin can include a polyethylene terephthalate resin, a polytrimethylene terephthalate resin, a polybutylene terephthalate resin, a non-crystalline polyethylene terephthalate resin or a combination thereof, for example a polybutylene terephthalate resin and/or a polyethylene terephthalate resin may be used.

The polybutylene terephthalate resin is a condensation-polymerized polymer obtained through a direct ester reaction or an ester exchange reaction of 1,4-butanediol, and terephthalic acid or dimethyl terephthalate monomer.

To increase the impact strength of the polybutylene terephthalate resin, the polybutylene terephthalate resin may be modified by copolymerization with polytetramethylene glycol (PTMG), polyethylene glycol (PEG), and/or polypropylene glycol (PPG), and/or by blending with a low molecular-weight aliphatic polyester and/or aliphatic polyamide.

The polybutylene terephthalate resin may have an intrinsic viscosity [η] of about 0.35 to about 1.5 dl/g, for example about 0.5 to about 1.3 dl/g in o-chloro phenol at 25° C. When the polybutylene terephthalate resin has an intrinsic viscosity [η] within the above range, the polybutylene terephthalate resin may have excellent mechanical strength and flowability.

The polyalkyl(meth)acrylate resin may be obtained by polymerizing a monomer including an alkyl(meth)acrylate through a known polymerization method, such as a suspension polymerization method, a bulk polymerization method, an emulsion polymerization method and the like.

The alkyl(meth)acrylate may have a C1 to C10 alkyl group. Examples of the alkyl(meth)acrylate may include without limitation methyl(meth)acrylate, ethyl(meth)acrylate, butyl(meth)acrylate, glycidyl(meth)acrylate, hydroxyethyl(meth)acrylate, and the like, and combinations thereof.

The polyalkyl(meth)acrylate may have a weight average molecular weight of about 10,000 to about 200,000 g/mol, for example about 15,000 to about 150,000 g/mol. When the polyalkyl(meth)acrylate has a weight average molecular weight within the above range, hydrolysis resistance, scratch resistance, flowability, and the like may be improved.

The styrenic resin may include a polymer including about 20 to about 100 wt % of an aromatic vinyl monomer; and about 0 to about 80 wt % of a vinyl-based monomer. Examples of the vinyl-based monomer may include without limitation unsaturated nitrile monomers, acrylic-based monomers, heterocyclic monomers, and the like, and combinations thereof.

In some embodiments, the styrenic resin may include the aromatic vinyl monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt %. Further, according to some embodiments of the present invention, the amount of the aromatic vinyl monomer can be in a range from about any of the foregoing amounts to about any other of the foregoing amounts.

In some embodiments, the styrenic resin may include a vinyl-based monomer in an amount of 0 (the vinyl-based monomer is not present), about 0 (the vinyl-based monomer is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the vinyl-based monomer can be in a range from about any of the foregoing amounts to about any other of the foregoing amounts.

Examples of the aromatic vinyl monomer may include without limitation styrene, C1 to C10 alkyl-substituted styrenes, halogen-substituted styrenes, and the like, and combinations thereof. Examples of the alkyl-substituted styrene may include without limitation o-ethyl styrene, m-ethyl styrene, p-ethyl styrene, α-methyl styrene, and the like, and combinations thereof. The styrenic resin may include, for example, a rubber modified polystyrene (HIPS) resin.

Examples of the polyolefin resin may include without limitation polyethylene (PE) resins, polypropylene (PP) resins, copolymers thereof, and the like, and combinations thereof.

The thermoplastic resin may be used in a form of mixture of at least two kinds thereof. Examples thereof may include without limitation a mixture of polycarbonate, an acrylonitrile-butadiene-styrene (ABS) resin; a mixture of polycarbonate, an acrylate-styrene-acrylonitrile (ASA) resin; and the like.

Pearlescent Pigment

The pearlescent pigment according to one embodiment comprises a substrate which may be a thin flake. Examples of the pearlescent pigment include without limitation plate-shaped titanium dioxide, synthetic and/or natural mica, glass flake, metal flake, plate-shaped silica, plate-shaped alumina, plate-shaped iron oxide, and the like, and combinations thereof. Pearlescent pigments suitable for use in the invention are known and are commercially available.

The pearlescent pigment may provide a unique appearance to a molded article such as excellent decorativeness and plentiful change together with the various colors on the surface of molded product by reflecting the incident light.

To improve the decorativeness, the compositions of the invention including the pearlescent pigment may be used in a wide variety of fields such as automobiles, motorcycles, OA devices, telephones, mobile phones, various printed matters, writing implements, and the like.

Among them, the composition including the pearlescent pigment can be useful in the production of exterior plastic products for products exposed to outdoor elements and requiring high weather resistance, such as automobiles and motorcycles. For example, when such products are exposed to ultraviolet (UV) radiation, decomposition or discoloration can be accelerated due to the photo catalyst activity of titanium dioxide and/or iron oxide included in the pigment.

One embodiment of the present invention may include a pearlescent pigment in which polysiloxane and a rare earth element metal compound are adhered to mica flake coated with metal oxide, such as disclosed in Japanese Patent Laid-Open Publication No. 1985-92359, the entire disclosure of which is incorporated by reference, in order to prevent the decomposition or the discoloration of a pigment.

One embodiment of the present invention may include a pearlescent pigment in which (i) a zirconium oxide hydrate produced by hydrolyzing a zirconium compound in the presence of hypophosphorous acid, and (ii) an oxide hydrate produced by hydrolyzing a water-soluble compound of at least one metal selected from the group consisting of cobalt, manganese, and cerium are adhered to the surface of mica flake coated with metal oxide, such as disclosed in Japanese Patent Laid-Open Publication No. 1989-292067, the entire disclosure of which is incorporated by reference.

One embodiment of the present invention may include a pearlescent pigment in which a micro plate-shaped substrate coated with metal oxide is coated with a covering layer such as disclosed in Japanese Patent Laid-Open Publication No. 1995-18199, the entire disclosure of which is incorporated by reference. The covering layer can include silicon dioxide, a metal hydroxide, and/or an organic coupling agent.

One embodiment of the present invention may include a pearlescent pigment in which mica flake coated with a titanium dioxide or an iron oxide is coated with a cerium hydroxide and an aluminum oxide, such as disclosed in Japanese Patent Laid-Open Publication No. 1995-268241, the entire disclosure of which is incorporated by reference.

One embodiment of the present invention may include a pearlescent pigment in which mica flake coated with a titanium dioxide or an iron oxide is coated with an aluminum hydroxide (or cerium hydroxide and aluminum hydroxide) and treated with a silane coupling agent, such as disclosed in. Japanese Patent Laid-Open Publication No. 2000-505833, the entire disclosure of which is incorporated by reference.

According to one embodiment, the present invention may include a pearlescent pigment in which a plate-shaped substrate is coated with a layer of hydroxide of Al or Si, a layer of hydroxide of at least one element selected from the group consisting of Al, Si, Ce, and Zr, and a layer of an organic hydrophobic coupling agent, such as disclosed in Japanese Patent Laid-Open Publication No. 2002-194247, the entire disclosure of which is incorporated by reference.

The various foregoing pearlescent pigments, and combinations thereof, may be used, but the present invention is not limited to the aforementioned examples of pearlescent pigment.

Pigment

The present invention according to one embodiment may include an additional pigment that is not the same as the pearlescent pigment described above. The pigment may be an organic pigment, an inorganic pigment, or a combination thereof. Pigments suitable for use in the invention are known and are commercially available.

The pigment may be any pigment known in the art to be useful in a general paint. Examples thereof may include without limitation phthalocyanine pigments, quinacridone pigments, perylene pigments, anthraquinone pigments, DPP pigments, metal complex pigments, transparent iron oxide pigments, carbon black, titanium oxide, zinc oxide, and the like, and combinations thereof. Additional examples of the pigment may include without limitation metal powder pigments such as aluminum powder, copper powder, stainless steel powder, and the like, and combinations thereof.

In addition, the pigment may include a special metal pigment such as but not limited to metal colloid, and the like, and combinations thereof.

The pigment according to one embodiment may include mica pigment which is a widely known material, such as but not limited to, transparent pearl mica, colored mica, and the like, and combinations thereof. In addition, the pigment may include an optical interference pigment also as known in the art, such as but not limited to interference mica, interference alumina, interference silica (interference glass), and the like, and combinations thereof.

In the thermoplastic resin composition according to one embodiment, other fillers, an antistatic agent, a stabilizer, an antioxidant, an ultraviolet (UV) absorber and the like and combinations thereof may be mixed together with the pigment, if required.

Inorganic Particle

The thermoplastic resin composition may further comprise an inorganic particle that is different from the pearlescent pigment and the other pigment described above. Inorganic particles suitable for use in the invention are known and are commercially available.

The inorganic particle may be a different kind of sparkling particle having a flat surface reflecting light. As used herein, the flat surface can have a degree of flatness such that the sparkling particles can be identified or seen with the naked eye, for example, the surface of a glass plate.

Examples of the inorganic particle may include without limitation glass particles, mica, graphite, pearl particles, and the like, and combinations thereof. In exemplary embodiments, the inorganic particle can be a glass particle.

The glass particle can have a plate-shaped structure so that it differs structurally from a glass fiber having a cylindrical shape. A cylindrical glass fiber does not provide a metal-like texture because it does not reflect light.

The cross-sectional configuration of the glass particle is not limited and can have, for example, can have a circular, oval, amorphous, or other cross-section.

The inorganic particle may have an average particle diameter of about 10 to about 200 μm, a thickness of about 0.5 to about 10 μm, and a cross-sectional area of about 80 to about 32,000 μm$^2$. When the inorganic particle has an average particle diameter, thickness, and cross-sectional area within the above ranges, the molded product can have an excellent metal-like texture with few or no flow mark(s) and/or weld line(s).

The thermoplastic resin composition may include the inorganic particle in an amount of about 0.1 to about 3.0 parts by weight, for example, about 0.1 to about 1.2 parts by weight, based on about 100 parts by weight of the thermoplastic resin. In some embodiments, the thermoplastic resin composition can include the inorganic particle in an amount of about 0.1, 0.2, 0.3, 0.4, 0.5, 0.6, 0.7, 0.8, 0.9, 1, 2, or 3 parts by weight. Further, according to some embodiments of the present invention, the amount of the inorganic particle can be in a range from about any of the foregoing amounts to about any other of the foregoing amounts.

When the thermoplastic resin composition includes the inorganic particle in an amount within the above range, a molded product formed of the composition may have excellent impact strength and excellent metal-like texture with few or no flow mark(s) and/or weld line(s).

Other Additive(s)

The thermoplastic resin composition may further include one or more additive(s). Examples of the additive may include without limitation antibacterial agents, heat stabilizers, antioxidants, release agents, light stabilizers, surfactants, coupling agents, plasticizers, admixtures, colorants, stabilizers, lubricants, anti-static agents, coloring aids, flame retardants, weather-resistance agents, ultraviolet (UV) absorbers, ultraviolet (UV) blocking agents, nucleating agents, adhesion aids, adhesives, and the like, and combinations thereof.

Examples of the antioxidant may include without limitation phenol type antioxidants, phosphite type antioxidants, thioether type antioxidants, amine type antioxidants, and the like, and combinations thereof.

Examples of the release agent may include without limitation fluorine-containing polymers, silicone oils, stearic acid metal salts, montanic acid metal salts, montanic ester waxes, polyethylene waxes, and the like, and combinations thereof.

Examples of the weather-resistance agent may include without limitation benzophenone-type weather-resistance agents, benzotriazole-type weather-resistance agents, amine-type weather-resistance agents, and the like, and combinations thereof.

Examples of the colorant may include without limitation dyes, pigments, and the like, and combinations thereof.

Examples of the ultraviolet (UV) ray blocking agent may include without limitation titanium dioxide ($TiO_2$), carbon black, and the like, and combinations thereof.

Examples of the nucleating agent may include without limitation talc, clay, and the like, and combinations thereof.

The additive may be included in a predetermined amount as long as it does not deteriorate the properties of the thermoplastic resin composition. It exemplary embodiments, the thermoplastic resin composition may include the additive(s) in an amount of less than or equal to about 40 parts by weight, for example about 0.1 to about 30 parts by weight, based on about 100 parts by weight of the thermoplastic resin.

The thermoplastic resin composition may be prepared using any well-known method of preparing a thermoplastic resin composition. For example, each component according to one embodiment of the present invention can be simultaneously mixed optionally with one or more optional additives. The mixture can be melt-extruded and prepared into pellets.

According to another embodiment of the present invention, a molded product fabricated using the thermoplastic resin composition is provided. The thermoplastic resin composition can be used to manufacture a molded product using various conventional processes such as injection molding, blow molding, extrusion molding, compression molding, and the like. For example, the composition of the invention may be used to manufacture a molded product such as but not limited to plastic exterior products for electronic parts, automobile parts, and the like having few or no flow mark(s) and/or weld line(s) and having the appearance of a metal-like texture.

The following examples illustrate this invention in more detail. However, it is understood that this invention is not limited by these examples.

EXAMPLE

Thermoplastic resin compositions are prepared using the types and amounts of components as shown in the following Table 1:

TABLE 1

|  |  | Examples |  |  |  |  |  |  |  | Comparative Examples |  |  |  |  |  |
|---|---|---|---|---|---|---|---|---|---|---|---|---|---|---|---|
|  |  | 1 | 2 | 3 | 4 | 5 | 6 | 7 | 8 | 1 | 2 | 3 | 4 | 5 | 6 |
| (A) Thermoplastic resin (parts by weight) |  | 100 | 100 | 100 | 100 | 100 | 100 | 100 | 100 | 100 | 100 | 100 | 100 | 100 | 100 |
| (B) Pearlescent pigment | (B-1) (parts by weight) | 0.3 | 0.1 | 0.5 | 1.0 | — | — | — | — | 0.3 | 1.0 | — | — | — | — |
|  | (B-2) (parts by weight) | — | — | — | — | 0.3 | 1.0 | — | — | — | — | 0.3 | 1.0 | — | — |
|  | (B-3) (parts by weight) | — | — | — | — | — | — | 0.3 | 1.0 | — | — | — | — | 0.3 | 1.0 |
| (C) Pigment | (C-1) (parts by weight) | 0.5 | 0.3 | 0.3 | 0.5 | — | — | — | — | — | — | — | — | 0.5 | 0.5 |
|  | (C-2) (parts by weight) | — | — | — | — | 0.5 | 0.5 | — | — | 0.5 | 0.5 | — | — | — | — |
|  | (C-3) (parts by weight) | — | — | — | — | — | — | 0.5 | 0.5 | — | — | 0.5 | 0.5 | — | — |
| Color difference (CCM) | da | 3.0 | 4.2 | 3.0 | 4.2 | 1.9 | 1.9 | 2.5 | 2.5 | −12.8 | −12.8 | −25.2 | −25.2 | 38.1 | 38.1 |
|  | db | 10.1 | 9.4 | 10.1 | 9.4 | 5.2 | 5.2 | 7.7 | 7.7 | −28.1 | −28.1 | 21.9 | 21.9 | 6.2 | 6.2 |

Each component shown in Table 1 is as follows.

(A) Thermoplastic resin (Cheil Industries Inc.)

An ABS/PMMA (acrylonitrile-butadiene-styrene/polymethylmethacrylate) blend resin including 30 wt % of styrene-acrylonitrile (SAN) resin, 45 wt % of polymethylmethacrylate (PMMA) resin and 25 wt % of grafted acrylonitrile-butadiene-styrene (g-ABS) resin is used.

(B) Pearlescent pigment (CQV Co.)

(B-1): M-741S (a*: 13.03, b*: 8.75 in L*a*b* colorimetric system)

(B-2): M-761S (a*: 8.32, b*: −22.88 in L*a*b* colorimetric system)

(B-3): M-791S (a*: −12.41, b*: −9.35 in L*a*b* colorimetric system)

(C) Pigment (Eastwell Co.)

(C-1): Red S-A2G pigment having a color similar to B-1

(C-2): Violet S-IRS pigment having a color similar to B-2

(C-3): Green S-6G pigment having a color similar to B-3

Examples 1 to 8 and Comparative Examples 1 to 6

Each thermoplastic resin composition according to Examples 1 to 8 and Comparative Examples 1 to 6 is prepared using the types and amounts of components shown in Table 1 and then extruded in a general twin-screw extruder at a temperature range of about 180 to about 240° C. to provide extruded pellets.

The pellets obtained from Examples 1 to 8 and Comparative Examples 1 to 6 are dried at about 80° C. for about 4 hours, and a ASTM dumbbell-like specimen is injection molded using an injection molding machine having a 6 Oz injection capacity by setting a cylinder temperature of about 210 to about 230° C., a mold temperature about of 60° C., a molding cycle time at about 30 seconds to provide a specimen.

The obtained specimen is measured for appearance properties, and the results are shown in the following Table 2.

TABLE 2

|  |  | Examples | | | | | | | | Comparative Examples | | | | | |
| --- | --- | --- | --- | --- | --- | --- | --- | --- | --- | --- | --- | --- | --- | --- | --- |
|  |  | 1 | 2 | 3 | 4 | 5 | 6 | 7 | 8 | 1 | 2 | 3 | 4 | 5 | 6 |
| Appearance | Pearlescent texture (Flop index) | 19 | 18 | 22 | 25 | 22 | 27 | 16 | 22 | 26 | 29 | 27 | 31 | 24 | 28 |
|  | Flow mark | ⊚ | ⊚ | ⊚ | ○ | ⊚ | ○ | ⊚ | ○ | Δ | X | Δ | X | Δ | X |
|  | Weld line | ○ | ○ | ○ | ○ | ○ | ○ | ○ | ○ | X | X | X | X | X | X |

The references for evaluating the appearance properties in Table 2 are as follows.

Pearlescent Texture

The flop index is measured by using a spectrophotometer (manufacturer: BYK, model name: BYK Mac). The flip-flop effect, which is inherent texture of pearlescent pigment, is evaluated by coordinating three angles of 15°, 45° and 110°, and the results are shown in Table 2.

Flow Mark and Weld Line

Since mold having two gates are used in the injection molding, a weld line might be produced. The appearance of the injection molded product is observed by the naked eye and evaluated according to the following basis, and the results are shown in Table 2.

⊚: no discoloring in weld line or flow mark
○: no flow mark, but little discoloring in weld line
Δ: discoloring in weld line and flow mark
x: seriously discoloring in weld line and flow mark Referring to Table 2, it is confirmed that the thermoplastic resin compositions according to Examples 1 to 8 have excellent pearlescent texture and decreased flow mark and the weld line.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition comprising:
    a thermoplastic resin;
    about 0.1 to about 1 part by weight of a pearlescent pigment based on about 100 parts by weight of thermoplastic resin; and
    about 0.1 to about 1 part by weight of a pigment that is not the same as the pearlescent pigment based on about 100 parts by weight of thermoplastic resin,
    wherein the pearlescent pigment consists of a synthetic mica and a coating consisting of $TiO_2$ and $SnO_2$,
    wherein the pearlescent pigment and the pigment that is not the same as the pearlescent pigment are in the same color family, and
    wherein the thermoplastic resin is an acrylonitrile-butadiene-styrene (ABS)/polymethylmethacrylate (PMMA) blend resin.

2. The thermoplastic resin composition of claim 1, wherein the pigment that is not the same as the pearlescent pigment is an organic pigment, an inorganic pigment, or a combination thereof.

3. The thermoplastic resin composition of claim 1, wherein the pearlescent pigment has an average particle diameter of about 0.1 to about 50 μm.

4. The thermoplastic resin composition of claim 1, wherein the thermoplastic resin composition further comprises an inorganic particle comprising a glass particle, mica, graphite, a pearl particle, or a combination thereof.

5. The thermoplastic resin composition of claim 4, including the inorganic particle in an amount of about 0.1 to about 3 parts by weight based on about 100 parts by weight of the thermoplastic resin.

* * * * *

UNITED STATES PATENT AND TRADEMARK OFFICE
CERTIFICATE OF CORRECTION

PATENT NO.        : 9,657,167 B2                    Page 1 of 1
APPLICATION NO.   : 13/728123
DATED             : May 23, 2017
INVENTOR(S)       : Hye-Young Kim et al.

It is certified that error appears in the above-identified patent and that said Letters Patent is hereby corrected as shown below:

In the Specification

Column 3, delete Line 12 and insert:
--reflective luminance (L) at about 15°; L 45° refers to a--

Column 3, delete Line 13 and insert:
--reflective luminance (L) at about 45°; and L 110° refers to a--

Signed and Sealed this
Twenty-second Day of August, 2017

Joseph Matal
*Performing the Functions and Duties of the
Under Secretary of Commerce for Intellectual Property and
Director of the United States Patent and Trademark Office*